(12) United States Patent
Valetutti

(10) Patent No.: US 8,593,268 B2
(45) Date of Patent: Nov. 26, 2013

(54) TIME CLOCK CONTROL FOR OUTSIDE LIGHTING

(76) Inventor: Vincent Valetutti, Kerhonkson, NY (US)

( * ) Notice: Subject to any disclaimer, the term of this patent is extended or adjusted under 35 U.S.C. 154(b) by 178 days.

(21) Appl. No.: 13/136,689

(22) Filed: Aug. 8, 2011

(65) Prior Publication Data

US 2013/0041518 A1    Feb. 14, 2013

(51) Int. Cl.
*G08B 1/00* (2006.01)

(52) U.S. Cl.
USPC ............. 340/309.16; 340/815.4; 340/13.24; 700/296; 315/152; 315/312

(58) Field of Classification Search
USPC ............ 340/309.16, 815.4, 13.24, 13.25; 700/296; 315/152, 153, 154, 149, 312, 315/294

See application file for complete search history.

(56) References Cited

U.S. PATENT DOCUMENTS

| | | | |
|---|---|---|---|
| 6,204,615 B1 * | 3/2001 | Levy | 315/312 |
| 6,791,284 B1 * | 9/2004 | Levy | 315/292 |
| 7,369,056 B2 * | 5/2008 | McCollough, Jr. | 340/635 |
| 7,571,063 B2 * | 8/2009 | Howell et al. | 702/60 |
| 7,659,676 B2 * | 2/2010 | Hwang | 340/468 |
| 7,847,706 B1 * | 12/2010 | Ross et al. | 340/12.52 |
| 8,256,916 B2 * | 9/2012 | Richmond | 362/183 |
| 8,373,362 B2 * | 2/2013 | Chemel et al. | 315/297 |
| 2002/0175641 A1 * | 11/2002 | Andersen | 315/312 |
| 2008/0147337 A1 * | 6/2008 | Walters et al. | 702/64 |
| 2008/0191897 A1 * | 8/2008 | McCollough | 340/825.22 |
| 2009/0066258 A1 * | 3/2009 | Cleland et al. | 315/158 |
| 2009/0322253 A1 | 12/2009 | Buelow, II et al. | |
| 2010/0029268 A1 * | 2/2010 | Myer et al. | 340/825.22 |
| 2010/0030389 A1 | 2/2010 | Palmer et al. | |

FOREIGN PATENT DOCUMENTS

EP    2046095 A2 *    4/2009

* cited by examiner

*Primary Examiner* — Eric M Blount
(74) *Attorney, Agent, or Firm* — Saile Ackerman LLC; Stephen B. Ackerman

(57) ABSTRACT

A device and method to automatically control timing of outside lighting are achieved. An ephemeris program and a calendar are loaded into memory on a timing device. Power is applied to the device wherein a GPS circuit on the device is energized, and Greenwich Mean Time (GMT), Current Day (CD), and physical location of the device are determined from satellite signals through an antenna or alternately from a repeater circuit or a key fob type device. GMT and CD that are retrieved are stored in memory. Lighting on and off times are calculated by the ephemeris program based on physical location, the calendar, GMT, CD, and the user selected distance of the sun below the horizon. Lights are turned on and off based on the calculated on and off times.

31 Claims, 3 Drawing Sheets ered by email.
TIME CLOCK CONTROL FOR OUTSIDE LIGHTING

BACKGROUND OF THE INVENTION (1) Field of the Invention

The invention relates to controlling outside lighting, and more particularly, to automatically controlling the timing of outside lighting based on the physical location of the lighting.

(2) Description of the Related Art

It is desired to automatically control turning on and off outside lighting. One current practice is to use a photocell to sense ambient lighting from the sun, turn on the lighting when the sunlight is below a certain level, and turn off the lighting when the sunlight is above a certain level. This method may leave lights on longer than necessary before turning them off in the morning. Another current practice is to use a timer set to turn on the lights at the particular time and turn them off at a second particular time. As the days progress and sunrise and sunset times change, the timer must be reset frequently. Another possible method is to use an astronomic time clock to control the timing of the lighting. It is necessary to correctly set an astronomic clock.

Outside lighting control is addressed in a variety of patents. U.S. Patent Application 2010/0030389 (Palmer et al) discloses personal computer control of automatic irrigation and lighting systems. A lighting zone can be set in accordance with sunrise and sunset times. Given the location, a forecasting site provides sunrise and sunset data at preset intervals. This requires an active connection to the Internet. The schedule can be transmitted by email.

U.S. Pat. No. 7,847,706 (Ross et al) shows a lighting control unit using location to calculate sunrise and sunset times. This method requires frequent communication with a wireless network.

U.S. Pat. No. 7,571,063 (Howell et al) teaches lighting control and performance monitoring. For example, lights can be turned off or dimmed at an earlier hour on Sunday when a store closes earlier than other days. This method depends on setting a timer for particular on and off times.

U.S. Patent Application 2009/0322253 (Buelow II et al) teaches that a command system schedules changes in mode of a LED lighting system based on input from the atomic time clock.

SUMMARY OF THE INVENTION

A principal object of the present invention is to provide a method of automatically controlling the timing of outside lighting.

Another object of the invention is to provide a device for automatically controlling the timing of outside lighting.

Yet another object of the invention is to provide a method of automatically controlling the timing of outside lighting based on the physical location of the lighting and civil sunrise and sunset times. Civil sunset is the time after sunset when lighting is required and civil sunrise is the time before sunrise when lighting is no longer required.

Yet another object is to provide a device for automatically controlling the timing of outside lighting based on the physical location of the lighting and civil sunrise and sunset times.

A further object of the invention is to provide a method of automatically reporting failure of burned out light bulbs.

A still further object is to provide a device for automatically reporting failure of burned out light bulbs.

In accordance with the objects of this invention a device to automatically control timing of outside lighting is presented. The device comprises a Global Positioning System (GPS) circuit for determining the device's physical location, memory for storing Greenwich Mean Time (GMT) and Current Day (CD) and for storing a Calendar (100 years) and a program to calculate lighting on and off times based on the device's physical location and on the ephemeris movement of the sun relative to that position on the earth, and a relay to turn lights on and off based on calculated on and off times.

Also in accordance with the object of the invention, a method to automatically control timing of outside lighting is described. An ephemeris program and a calendar are loaded into memory on a timing device. Power is applied to the device wherein physical location of the device is determined. Greenwich Mean Time (GMT) and Current Day (CD) are loaded into the memory. Lighting on and off times are calculated by the ephemeris program based on physical location, the calendar, GMT, CD, and the sun's distance below the horizon. Lights are turned on and off based on the calculated on and off times.

BRIEF DESCRIPTION OF THE DRAWINGS

In the accompanying drawings forming a material part of this description, there is shown.

DESCRIPTION OF THE PREFERRED EMBODIMENTS

The present invention provides a method and a device for automatically controlling the timing of outside lighting based on the physical location of the lighting and civil sunrise and sunset times. Civil sunset is the time after sunset when lighting is required and civil sunrise is the time before sunrise when lighting is no longer required. For example, civil sunrise and sunset, or civil twilight, is the time when the sun is 6 degrees below the horizon. Automatically controlling outside lighting to be on only during the time between civil sunset and civil sunrise each day will increase energy and cost savings because the lighting will be on only when necessary and because no operator input is needed.

Figure 1:
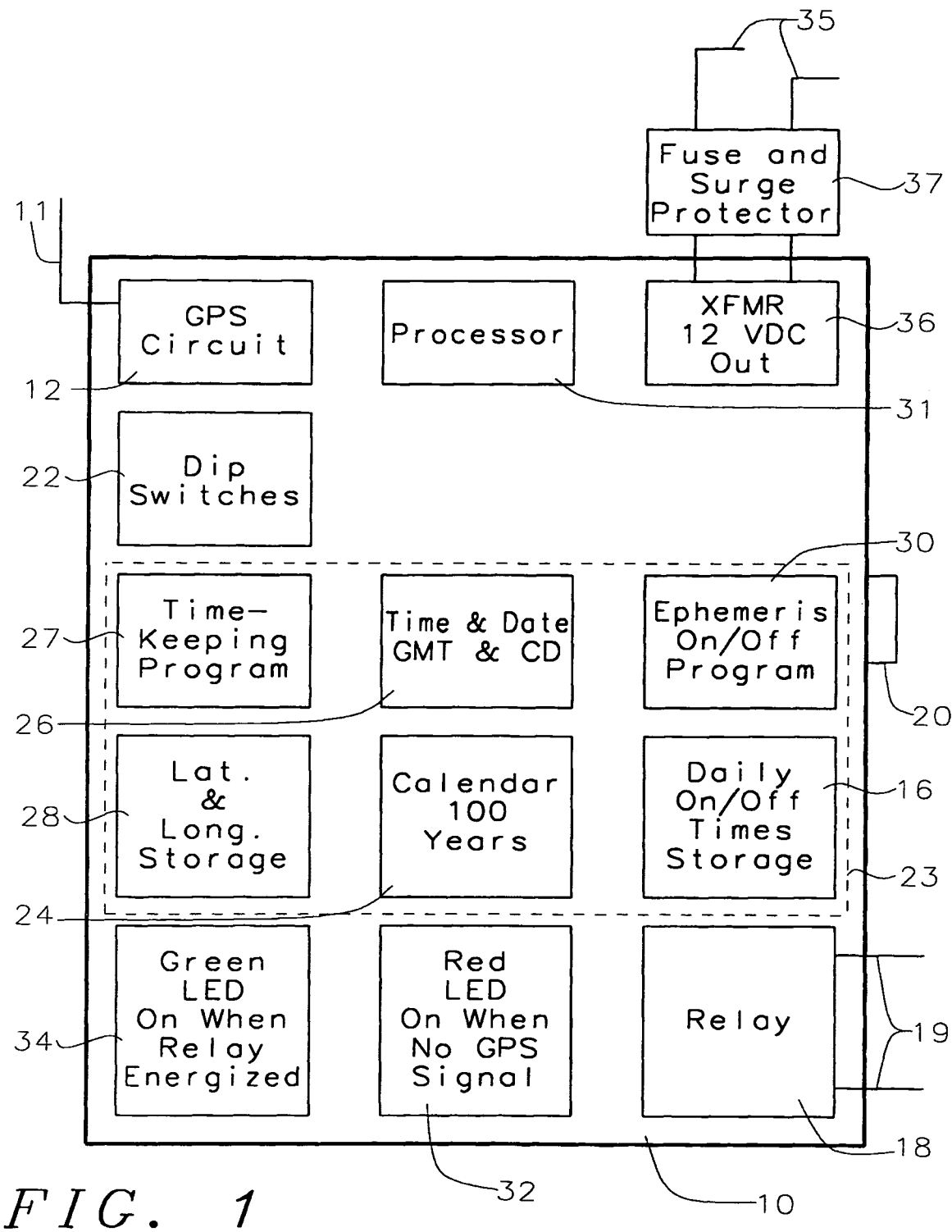
FIG. 1 schematically represents a first preferred embodiment of the present invention.

FIG. 1 illustrates a schematic for a device according to a first preferred embodiment of the invention. The very accurate time clock control for outside lighting of the invention can reside on a small printed circuit board 10. Key features of the device include a GPS circuit 12. This GPS circuit 12 can be very simple since it is only used to obtain latitude and longitude, GMT, and CD. A GPS antenna 11 can be located at the spot where a photocell might be located in a conventional outside lighting system of the prior art. Memory 23 will be a mixture of volatile and non-volatile memory, as required. Upon application of power, through inputs 35, to the transformer 36, through a fuse and surge protector 37, the GPS circuit 12 calculates the location (latitude and longitude) and stores it in non-volatile memory 28 as Latitude and Longitude. The GPS circuit also retrieves GMT and CD which are stored in the time and date section 26 of memory 23. A small time-keeping program 27 is used to keep the time and date current. The ephemeris program and a 100-year calendar are stored in non-volatile memory section 30 and 24, respectively.

To calculate on/off times, based on the ephemeris movement of the sun relative to unit's location on the earth's surface (GPS location; i.e. latitude and longitude), processor 31, such as a microcontroller, runs the program 30. The calculated daily on/off times 16 are stored in memory 23, which could be either volatile or non-volatile, depending on how the ephemeris program is written. A relay 18 turns the lights on and off through wires 19.

Some additional features could be provided on the device 10. A USB port 20 could provide an alternate means to install calendar and ephemeris program at the time of manufacture. Alternatively, input 20 could be for a Bluetooth®, or other wireless technology connection. Dip switches or jumpers 22 may be provided to determine the desired distance in degrees the sun is below the horizon when the lights turn on and off; for example, 3, 4, 5, or 6 degrees or other distance below the horizon. A red LED light 32 may be provided to indicate when a GPS signal is not available. A green LED light 34 may indicate when the lighting relay is turned on.

Figure 2:
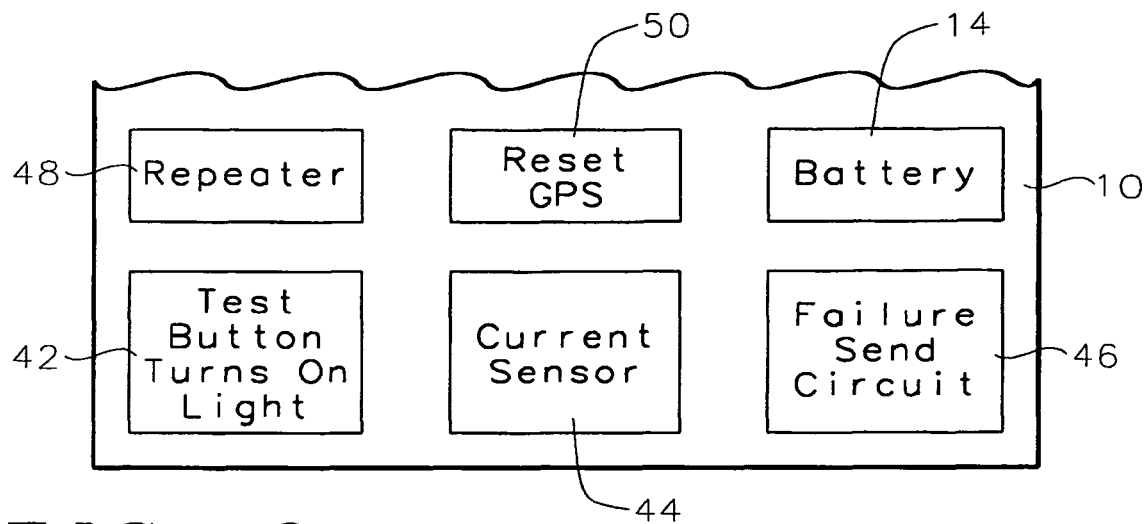
FIG. 2 schematically represents additional options in a first preferred embodiment of the present invention.

FIG. 2 illustrates some optional features. A watch-sized battery 14, for example, can maintain Greenwich Mean Time (GMT) and Current Date (CD) stored in the time and date section 26 of memory 23. This would be useful, for example, during power failures or where the device is installed and access to satellite signals is blocked by tall buildings or other ground features and GMT and CD could not be re-acquired from the GPS satellite system. An alternative to the battery would be a photovoltaic cell and capacitor. This would maintain GMT and CD during power failures of any duration.

A test button 42 can be used to turn the lights on; for example, at installation or after replacing a light bulb. A current sensor 44 can measure current, the value of which can then be used to test for bulb failure. If there is a bulb failure, the failure send circuit 46 can send a failure report. For example, a telephone call (cellular phone) could be made to a dedicated toll-free telephone number. The bulb failure report, sent as a text message or other means, would include the time clock unit's identification (ID), a unique serial number, and location (latitude and longitude).

A computer or other device, located and/or connected to the toll free telephone number, would create an owner's report that would be sent by email or by regular mail or other means, notifying the owner of the lighting system failure. Information provided by the owner at the time of purchase and stored in a database would provide the means for contacting the owner and reporting the bulb failure. Additional options include a repeater 48 to send GPS and/or GMT and CD information to another device in a string and a Reset GPS button 50 to be used in case the time clock control device is moved and a new location needs to be determined for the device.

Figure 3:
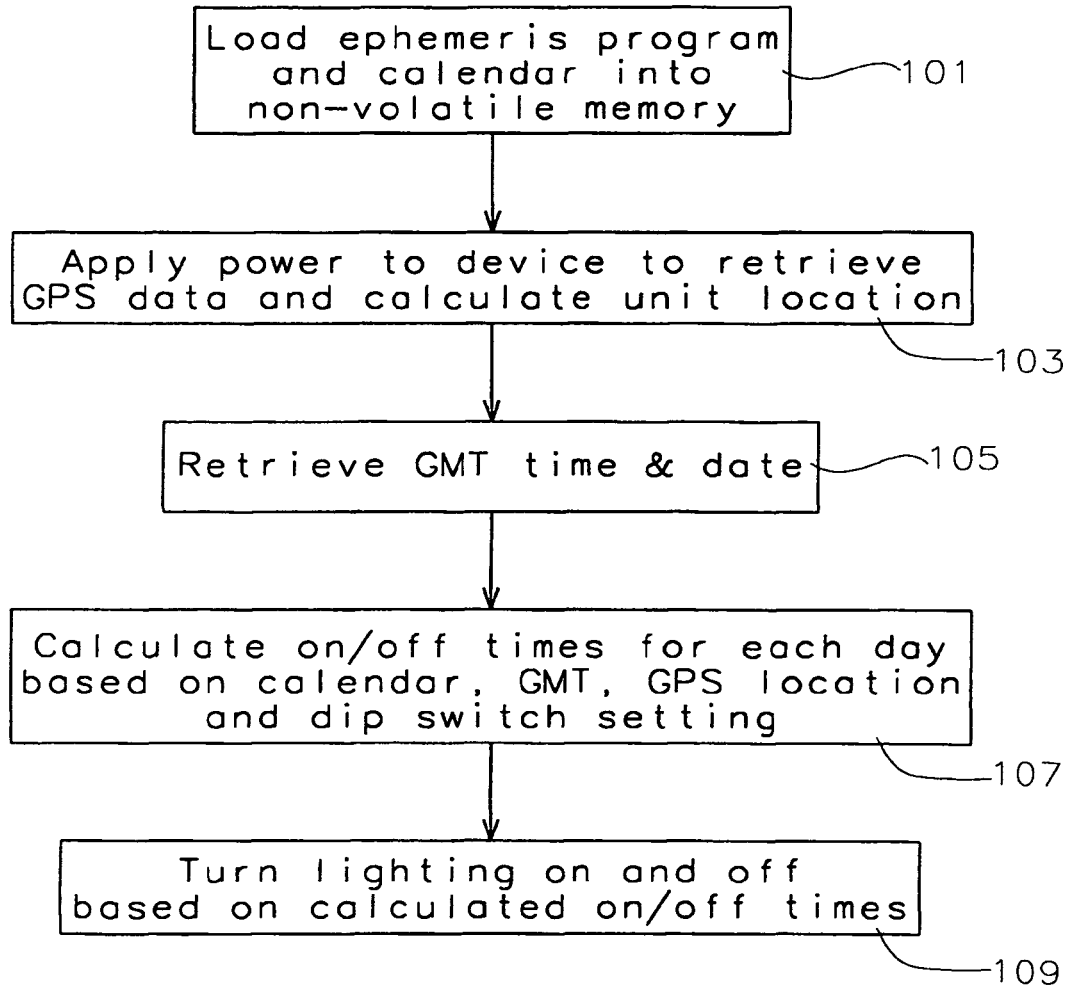
FIG. 3 schematically represents a flowchart of the operation of a preferred embodiment of the present invention.

The method of accurately controlling the timing of outside lighting according to the present invention is shown in the flowchart in FIG. 3. In step 101, at the time of manufacture of the time clock control unit 10, the ephemeris program and calendar are loaded into memory 23 in the program section 30 and calendar section 24, respectively. For example, the calendar section may store a 100-year calendar.

At installation, power is applied to transformer 36 through fuse and surge protector 37. For example, a line voltage of 120 V and 60 Hz may be applied to the unit 10 through inputs 35. When power is applied, in step 103, the GPS circuit 12 is energized and location is determined from antenna satellite signals, pinpointing the unit's latitude and longitude and storing it in the latitude and longitude section 28. Upon power-up, a red light-emitting diode (LED) 32, for example, is lit. If there is no GPS signal detected, the red light 32 stays on. If a GPS signal is detected and location determined, the red light 32 is extinguished. In step 105, GMT time and CD date are retrieved from GPS satellite signals and loaded into the time and date section 26 of memory 23. Alternatively, for a unit that is blocked from GPS satellite signals, longitude and latitude information can be obtained via a portable device, such as a unique key fob. The key fob is unique to the GPS device for this invention. It obtains GPS signals in an open area with access to satellite signals, retrieves GMT and CD information, and calculates latitude and longitude. This data can then be transmitted from the portable device to the time clock control unit of the invention. This option is useful, for example, in cities where buildings block access to GPS satellites. In another option, a repeater element 48 can be used. For example, there may be a string of lights, for example, along a street. The time clock control unit for the first light in the string can obtain the location information, GMT, and CD, and then transmit that information to the next light in the string, which transmits to the next light, and so on.

For a unit that is blocked from GPS satellite signals, GMT time and CD date normally retrieved from GPS satellite signals can be maintained by the battery 14 or by a photovoltaic cell and capacitor so that the information is not lost during power failures. Alternatively, Location (latitude and longitude), GMT and CD may be loaded from an internet-connected device to a small portable device such as a key fob via Bluetooth®, for example, as described above. This information can be transmitted from the portable device to the time clock control unit of the invention via Bluetooth®, USB, or other means.

Dip switches or jumpers 22 are set at the factory. The dip switches indicate the ephemeris movement of the sun below the horizon in degrees relative to the unit's position on the earth. That is, the lights should be turned on when the sun is 6 degrees or more below the horizon (civil twilight time), for example. These dip switches can be reset to 5, 4, or 3 degrees below the horizon as required by the user. Other degrees below the horizon can also be provided by the dip switches on the device. Optionally, a different program can be stored in the program memory 30 and used to determine when artificial lighting is required. For example, at high latitudes, it takes longer for darkness to occur, in the spring and summer, since the sun sets at a shallower angle to the horizon.

In step 107, the microcontroller 30 runs the program stored in memory section 30 to calculate on/off times each day based on input from the calendar 24, GMT time and CD date 26, the latitude and longitude of the unit 28, and the setting of the dip switches or jumpers 22. This data is stored in the daily on/off times memory section 16. This section 16 controls the on/off relay 18 each day.

In step 109, the lights are turned on and off each day based on the calculated on/off times. Power contacts 19 for the lights are controlled by the relay 18. A green LED 34 is on whenever the relay 18 is on.

Figure 4:
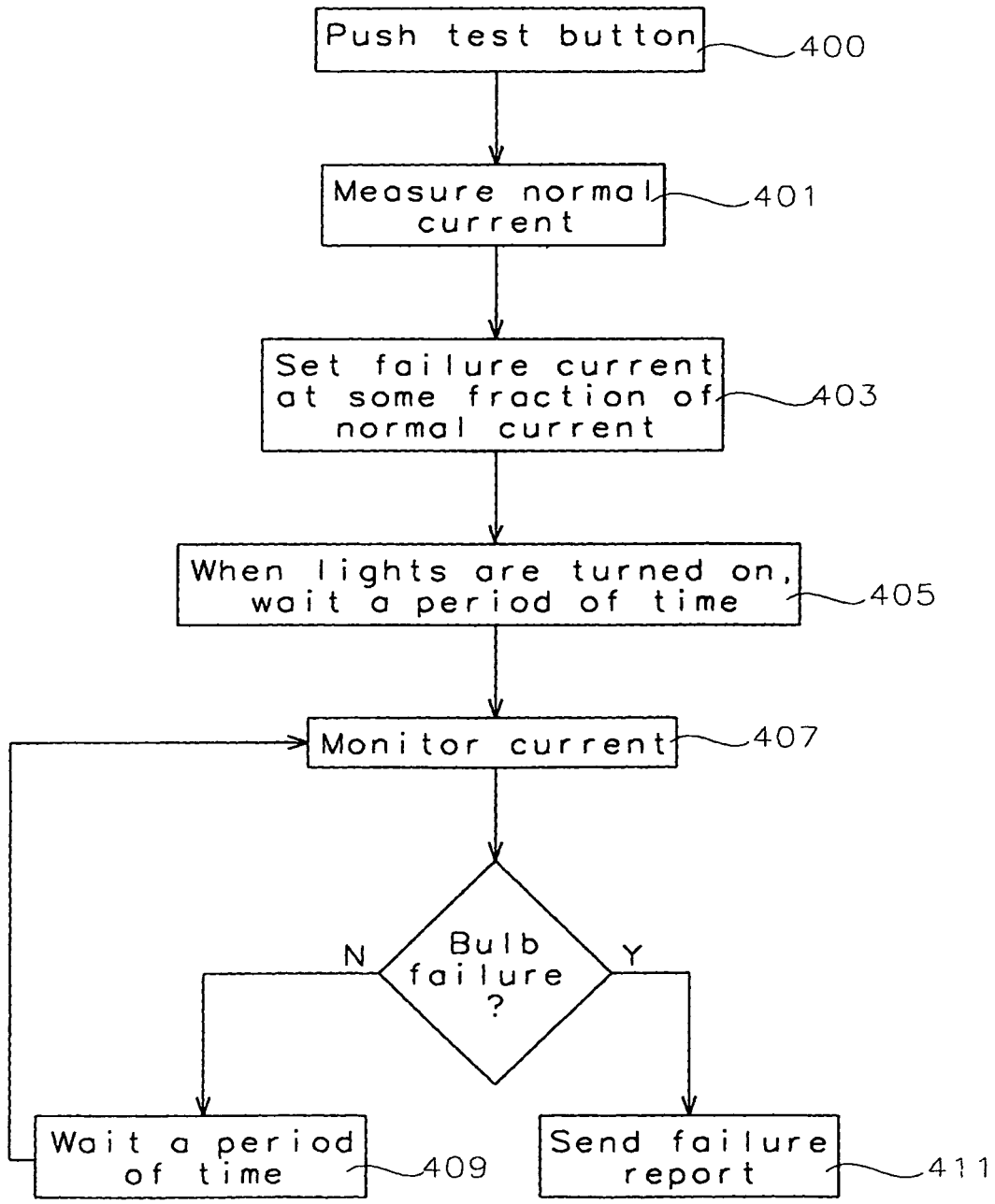
FIG. 4 schematically represents a flowchart of the operation of the optional failure testing sequence of a preferred embodiment of the present invention.

The optional failure testing sequence is illustrated in the flowchart of FIG. 4. An optional test button 42 (shown in FIG. 2) can be used to turn on the lights at installation and when maintenance has been performed, for example. A current sensor 44 can be used to test for bulb failure. When the test button is pushed (step 400), the light is turned on for a preset period of time (for example, 30 minutes). The normal current is measured after 10 minutes, for example (step 401). The failure ampere level is set at some fraction of the normal current (step 403), for example, ½. Whenever the lights turn on, the current sensor 44 waits a period of time (step 405), such as ten minutes, for the light to warm up. Then, the current sensor checks for bulb failure (step 407) and continues to check for bulb failure every 10 minutes, for example, (step 409).

If there is a bulb failure, the failure send circuit 46 can send a failure report (step 411). For example, a telephone call could be made to a dedicated toll-free telephone number, sending a failure report by cell phone data transmission. The unit's identification (ID), a unique serial number, and location (latitude and longitude) would be transmitted along with the bulb failure report. When a report is received at the toll free number location (i.e. a computer or other device), an owner's report would be generated. Notification would then be sent by email or by regular mail or other means, letting the owner of the lighting system know of the failure. Information provided by the owner at the time of purchase and stored in a database would provide the means of contacting the owner and reporting the bulb failure.

The method and device of the present invention automatically control the timing of outside lighting based on the physical location of the lighting and civil sunrise and sunset times, or other timing program. Optionally, automatic testing and reporting of burned out light bulbs or a low battery condition can be provided. Other types of failures can also be reported, such as reports of lights on during daylight hours. There are many advantages of the method and device of the present invention. Timing is provided by the device without constant or periodic connection to the Internet and without operator input of timing information. The device maintains GMT and CD and calculates civil twilight time, or other lights on/off time, based on the device's physical location. Thus, timing is automatically controlled each day by the device based on power up input and without further daily or periodic input from the Internet or from an operator.

While the invention has been particularly shown and described with reference to the preferred embodiments thereof, it will be understood by those skilled in the art that various changes in form and details may be made without departing from the spirit and scope of the invention.

What is claimed is:

1. A device to automatically control timing of outside lighting comprising:
   a GPS circuit for determining said device's physical location;
   a memory for storing Greenwich Mean Time (GMT) and Current Day (CD), and a program to calculate lighting on and off times based on said device's physical location, said GMT and CD, and on the ephemeris movement of the sun relative to said device's physical location on the earth;
   a processor to run said program; and
   a relay to turn lights on and off based on calculated said on and off times.

2. The device according to claim 1 further comprising a power supply and an antenna wherein upon application of power to said device through said power supply at installation time, said GPS circuit is energized and said physical location is determined from satellite signals through said antenna.

3. The device according to claim 2 further comprising an indicator LED that is lit if said satellite signals are unavailable.

4. The device according to claim 1 wherein said physical location, GMT, and CD are determined by a portable device and transmitted to said device by wireless means or through an input port.

5. The device according to claim 1 wherein said GMT and CD are loaded into said memory from said GPS circuit or from a computer through a USB port, or wherein said GMT and CD are loaded from an internet-connected portable device onto said device by wireless means, through an input port, or from a key fob type device.

6. The device according to claim 1 further comprising storing in said memory date information for multiple years.

7. The device according to claim 6 further comprising storing in said memory said on and off times calculated by said program for each day from said date information, said GMT and CD, and said physical location.

8. The device according to claim 1 further comprising a LED that is lit whenever said relay is on.

9. The device according to claim 1 further comprising a battery or a photovoltaic cell and capacitor for maintaining said GMT and CD.

10. The device according to claim 1 further comprising dip switches or jumpers wherein said dip switches or jumpers are set at time of manufacture or at a later time wherein said dip switches or jumpers indicate said ephemeris movement of the sun relative to said physical location on the earth and wherein the setting of said dip switches or jumpers determines on and off times at varying degrees of the sun's position below the horizon.

11. The device according to claim 10 wherein said dip switches or jumpers are set to 6 degrees at said time of manufacture and wherein said dip switches or jumpers can alternatively be set to 5, 4, or 3 degrees or other degrees that the sun is below the horizon.

12. The device according to claim 1 further comprising a test button to turn on said lighting.

13. The device according to claim 1 further comprising a current sensor to test for bulb failure of said lighting.

14. The device according to claim 13 further comprising a failure send circuit wherein when said current sensor indicates bulb failure, said failure send circuit sends a failure notice.

15. The device according to claim 14 wherein said failure notice further comprises a separate communication device comprising one or more of:
   a telephone call;
   an email notification; and
   a regular mail notification; and
wherein said failure notice includes an identification number for said device and said physical location of said device.

16. The device according to claim 1 wherein said device is a first device and wherein a plurality of said devices are in a line in close proximity to one another, wherein said device includes a repeater wherein said repeater sends said physical location, and said GMT and CD from said first device to the next device in line, and wherein said next device in line sends said physical location and said GMT and CD to the second next device in line, and so on.

17. A method to automatically control timing of outside lighting comprising:
   loading a timing program and a calendar into memory on a timing device;
   applying power to said device, determining physical location of said device, and storing said physical location in said memory;
   retrieving Greenwich Mean Time (GMT) and Current Day (CD) and storing GMT and CD in said memory;
   calculating lighting on and off times by said program based on said physical location, said calendar, said GMT, and said CD; and turning lights on and off based on calculated said on and off times.

18. The method according to claim 17 further comprising maintaining said GMT and CD during power failures with a battery or photovoltaic cell and capacitor.

19. The method according to claim 18 wherein said loading of location, GMT and CD is performed at one or more of:
   time of manufacture of said device;
   time of installation of said device; and
   time of replacement of said battery.

20. The method according to claim 17 wherein said loading of location, GMT and CD is from a computer through a USB port on said device or from an internet-connected portable device onto said device by wireless means or through an input port or other wireless device such as a key fob.

21. The method according to claim 17 wherein said physical location is determined by one or more of:
   energizing a GPS circuit on said device whereby said physical location of said device is determined from satellite signals through an antenna; and
   storing said physical location on a portable device and transmitting said physical location to said device by wireless means or through an input port.

22. The method according to claim 17 wherein said program calculates on and off times based on said physical location, said calendar, said GMT, and said CD, and the sun's distance below the horizon when lights are to be turned on.

23. The method according to claim 22 further comprising setting dip switches or jumpers at time of manufacture or at a later time wherein said dip switches or jumpers indicate said sun's position below the horizon in degrees wherein the user decides lights should be turned on and off at a different level of the sun below the horizon.

24. The method according to claim 23 wherein said dip switches or jumpers are set to 6 degrees at said time of manufacture and wherein said dip switches or jumpers can alternatively be set to 5, 4, or 3 degrees or other degrees that the sun is below the horizon.

25. The method according to claim 17 further comprising testing for bulb failure of said lighting.

26. The method according to claim 25 further comprising sending a failure notice when bulb failure is indicated.

27. The method according to claim 26 wherein said sending said failure notice further comprises a separate communication device comprising one or more of:
   placing a telephone call;
   sending an email notification; and
   sending a regular mail notification; and
wherein said failure notice includes an identification number for said device and said physical location of said device.

28. A device to automatically control timing of outside lighting, comprising:
   a GPS circuit for determining said device's physical location;
   dip switches or jumpers, wherein said dip switches or jumpers are set at time of manufacture or at a later time, indicating ephemeris movement of the sun relative to said physical location on the earth wherein setting of said dip switches or jumpers determines lighting on and off times at varying degrees of the sun's position below the horizon;
   a memory for storing Greenwich Mean Time (GMT) and Current Day (CD) and for storing a program to calculate said lighting on and off times based on said device's physical location said GMT and CD, and on said ephemeris movement of the sun relative to said physical location on the earth;
   a processor to run said program; and
   a relay to turn lights on and off based on calculated said on and off times.

29. The device according to claim 28 further comprising a power supply and an antenna wherein upon application of power to said device through said power supply at installation time, said GPS circuit is energized and said physical location is determined from satellite signals through said antenna and wherein said GMT and said CD are also received through said GPS circuit.

30. The device according to claim 28 wherein said location, GMT and CD are loaded onto said timing device from a computer through a USB port on said device or from an internet-connected portable device onto said device by wireless means or through an input port or other wireless device.

31. The device according to claim 28 further comprising a battery or a photovoltaic cell and capacitor for maintaining said GMT and CD during power failures.

* * * * *